Patented Feb. 21, 1939

2,148,288

UNITED STATES PATENT OFFICE 2,148,288

PRODUCTION OF OLEFIN HYDRATION PRODUCTS

Franklin A. Bent, Berkeley, Calif., assignor to Shell Development Company, San Francisco, Calif., a corporation of Delaware No Drawing. Application October 26, 1936, Serial No. 107,627

16 Claims. (Cl. 260—614)

This invention relates to the hydration of olefins and it provides a practical and economical process for the production of valuable and useful olefin hydration products, particularly alcohols and/or ethers.

This application is a continuation-in-part of my application Serial #714,002 filed March 5, 1934.

More particularly the invention relates to a process for the catalytic hydration of olefins to alcohols and/or ethers which comprises contacting an olefin with an aqueous solution comprising an aluminum salt of a strong acid such as possesses an acid character in water, preferably an aluminum salt selected from the class consisting of aluminum sulphate and the aluminum halides, at an elevated temperature preferably above about 100° C. and under a superatmospheric pressure.

The invention may be executed in a single reaction stage in a batch, intermittent or continuous manner as desired. Since the process may be continuously operated in a single stage for long periods of time without interruption, it is more easily and economically executed than are the conventional multi-stage, intermittent processes of preparing alcohols and ethers from olefins and strong mineral acids via absorption and subsequent treatment of the absorption solution.

The invention possesses further advantages over the known methods of preparing alcohols and ethers in the cheapness of the raw materials which may be employed, in the use of less corrosive hydration agents, in the inhibition of undesirable side reactions, and in the greater purity of the product or products obtainable.

The catalysts used in the execution of the invention are the aluminum salts of strong acids, preferably aluminum salts of the class consisting of aluminum sulphate and the aluminum halides. Aqueous solutions, preferably dilute aqueous solutions of the aluminum salts are employed. The catalysts may be used severally or mixtures comprising a plurality of aluminum salts of the type described and/or other hydration catalysts may be employed. An embodiment of the invention comprises the use of an aqueous solution of a suitable aluminum salt to which a mineral acid, preferably the acid corresponding to the negative radical of the salt, has been added. For example, I may contact an olefin with an aqueous solution of aluminum sulphate to which sulphuric acid has been added. The added sulphuric acid augments the activity of the aluminum sulphate and, due to its effect in inhibiting hydrolysis of the salt, aids in maintaining a more constant concentration of the salt in the system. On the other hand, the use of the salt with the free acid suppresses polymer formation which would be attendant on the use of the acid alone in any effective concentration. The process is operable over a wide range of catalyst concentrations. A practical operating range is from about 1% to about 50%. The ratio of the quantity of catalyst solution to quantity of olefin employed will depend on the operating conditions and upon whether the process is executed to obtain primarily an alcohol or primarily an ether.

The process is preferably executed at temperatures of 100° C. or higher. The specific temperature will depend to a certain extent on the other conditions of operation as pressure, ratio of olefin to catalyst solution, concentration of the catalyst, heating time, and upon the product or ratio of products desired. A practical upper limit of the temperature is a temperature just below the critical temperature of water (374° C.), it being desirable that at least some water be in the liquid state during the hydration. A preferable intermediate temperature range is from about 130° C. to 300° C.

The superatmospheric pressure under which the process of the invention is executed may vary over a wide range. It is, in general, desirable to operate in the temperature range of from about 100 atmospheres to about 600 atmospheres, although higher or lower pressures may be used. A practical operating pressure is in the range of from about 200 atmospheres to about 400 atmospheres, the higher pressures in general being preferred for ether production.

In general, a mixture of hydration products is obtained; however, by a suitable control of reaction conditions, catalyst concentration, ratio of olefin to catalyst solution and/or control of the concentration of products in the reaction zone, the process may be executed to obtain the desired mixture of products, or to obtain substantially an alcohol or substantially an ether. The ratio of ether to alcohol obtained is to a certain extent dependent upon the ratio of olefin to catalyst solution in the system, the higher ratios favoring ether formation. Accordingly, higher olefin to catalyst solution ratios, temperatures greater than 130° C., and pressures greater than 200 atmospheres are preferred for ether production.

It has been found that the conversion of an olefin to the corresponding alcohol and corresponding ether is an equilibrium reaction, and that by maintaining in the system a correct quantity of either alcohol or ether, the reaction may be controlled to produce substantially only an alcohol or substantially only an ether. When it is desired that the process produce substantially only an alcohol, the ether condensed from the vapors and unreacted gases leaving the pressure reactor may be returned thereto. The ether then builds up in the system to a maximum value and thereafter the formation of alcohol in the reactor is favored. In a similar manner, the process may be executed to yield substantially only ether by a return to the reaction zone of the alcohol separated from the vapors leaving the reactor. Thus, in addition to controlling reaction conditions and ratio of olefin to catalyst solution as described, by regulating the amount of alcohol or ether added to or returned to the pressure reactor, the production of these hydration products may be varied at will.

The invention is applicable broadly to the hydration of olefins, being particularly adapted to hydration of the normally gaseous olefins as ethylene, propylene, the normal butylenes and isobutylene. The olefins may be treated severally or in admixture. In lieu of the pure olefins, olefin-containing mixtures such as are obtainable by dehydrogenation or pyrolysis of petroleum, natural gas, petroleum products, animal and vegetable oils and other carbonaceous materials, may be treated. Olefin-containing hydrocarbon mixtures consisting predominantly of hydrocarbons containing the same number of carbon atoms to the molecule, such as ethane-ethylene, propane-propylene, butane-butylene and the like fractions, may be employed advantageously.

The invention may be operated in a variety of manners depending upon the choice of the operator and upon whether a batch, intermittent or continuous mode of operation is desired. When a batch operation is preferred, a suitable pressure vessel, such as a bomb or autoclave, may be charged with the desired amount of the selected aluminum sulphate or aluminum halide catalyst solution and the olefin forced into it until the desired pressure is obtained. The admission of the olefin may then be stopped and the reaction vessel heated to reaction temperature, preferably with agitation. As the pressure drops due to the hydration reaction, more olefin may be introduced, preferably into the lower part of the vessel below the surface of the catalyst solution, and the cycle repeated. When the alcohol and/or ether concentration reaches the desired value, the operation is terminated and the product or products recovered by distillation or other suitable means.

When a continuous mode of operation is desired, a suitable pressure vessel equipped with heating means and suitable inlet and outlet means, is charged to a certain level, which is kept substantially constant throughout the operation, with the aqueous catalyst solution. The catalyst solution is heated to the desired operating temperature while the olefin or olefin-containing mixture is forced into the reactor below the level of the catalyst solution at the desired rate while maintaining the desired superatmospheric pressure in the reactor. The olefin or olefin-containing mixture may be preheated prior to introduction into the reactor. The hydration products formed may be continuously or intermittently removed from the reaction vessel as vapors together with water vapor, unreacted olefin and inert gases, if present. The product or products may be recovered by condensation followed by distillation and/or other treatment of the condensate. Unreacted olefin may be recycled to the converter along with a part of either of the hydration products. It is desirable to introduce sufficient steam or water into the reactor continuously to compensate for the water removed with the hydration product, and thus maintain the catalyst concentration substantially constant throughout the operation. Since there is a wide range of catalyst concentrations over which the process is satisfactorily operable, the water or steam may be added intermittently or from time to time.

The following examples are introduced to illustrate suitable modes of executing the invention. The invention is not to be regarded as limited to the specific olefins, specific catalysts or specific operating conditions recited in the examples.

*Example I*

Gaseous propylene was passed into a suitable pressure vessel containing an aqueous aluminum chloride solution (concentration about 13.8%) maintained at a temperature of about 286° C. and under a total pressure of about 3000 lbs./sq. in. (gauge). The introduced propylene was rapidly hydrated to isopropyl alcohol. The isopropyl alcohol, along with water vapor and unreacted propylene, was continuously withdrawn from the reactor and passed into a condenser to condense and separate the isopropyl alcohol and water. The separated unreacted propylene, along with an amount of water sufficient to replace that removed with the alcohol, was returned to the reaction vessel. About 8.0% of the propylene was converted to isopropyl alcohol on one passage through the reactor.

*Example II*

Gaseous ethylene was bubbled, at the rate of about 1 c. c./minute, through about 600 c. c. of an aqueous solution of aluminum sulphate (concentration about 7.7%) contained in a suitable pressure vessel. During the operation, the catalyst solution was maintained at a temperature of about 300° C. and under a pressure of about 3000 lbs./sq. in. The operation was continued for about 60 minutes, the hydration products (ethyl alcohol and diethyl ether) being permitted to accumulate in the reactor. At the end of this time, the operation was terminated and the hydration products recovered from the catalyst solution. About 25% of the applied ethylene was converted to ethyl alcohol.

This application is a continuation-in-part of my copending application, Serial No. 714,002, filed March 5, 1934.

While the process herein described is well adapted to attain the various objects and advantages of the invention, it is to be understood that the invention is not to be restricted to the embodiments set forth, but is of the scope of the appended claims.

I claim as my invention:

1. A process for producing olefin hydration products which comprises subjecting an olefin to the action of an aqueous solution of an aluminum salt of the class consisting of aluminum sulphate and the aluminum halides at a temperature greater than about 100° C. but below the critical temperature of water and under a pressure sufficiently high to maintain at least a part of the water in the system in the liquid phase at the operating temperature.

2. A process for producing olefin hydration products which comprises subjecting an olefin to the action of an aqueous solution of an aluminum salt of the class consisting of aluminum sulphate and the aluminum halides at a temperature of from about 100° C. to about 374° C. and a pressure of from about 100 atmospheres to about 600 atmospheres.

3. A process for producing alcohols which comprises subjecting an olefin to the action of an aqueous solution of an aluminum salt of the class consisting of aluminum sulphate and the aluminum halides at a temperature of from about 100° C. to about 374° C. and a pressure of from about 100 atmospheres to about 600 atmospheres.

4. A process for producing ethers which comprises subjecting an olefin to the action of an aqueous solution of an aluminum salt of the class consisting of aluminum sulphate and the aluminum halides at a temperature of at least 130° C. and a superatmospheric pressure of at least 200 atmospheres.

5. A process for producing alcohols which comprises subjecting an olefin to the action of an aqueous solution of aluminum sulphate at a temperature of from about 100° C. to about 374° C. and a pressure of from about 100 atmospheres to about 600 atmospheres.

6. A process for producing ethers which comprises subjecting an olefin to the action of an aqueous solution of an aluminum halide at a temperature of at least 130° C. and a superatmospheric pressure of at least 200 atmospheres.

7. A process for producing ethers which comprises subjecting an olefin to the action of a dilute aqueous solution of an aluminum halide at a temperature of at least 130° C. and a superatmospheric pressure of at least 200 atmospheres, and recovering the non-aqueous product of the process.

8. A process for producing ethers, which comprises subjecting an olefin to the action of a dilute solution of aluminum chloride at elevated temperature of at least 130° C. and superatmospheric pressure of at least 200 atmospheres, and recovering the non-aqueous product of the process.

9. A process for producing alcohols which comprises subjecting an olefin to the action of a dilute aqueous solution of aluminum sulphate and sulphuric acid at a temperature of from about 100° C. to about 374° C. and a pressure of from about 100 atmospheres to about 600 atmospheres.

10. A process for producing alcohols which comprises subjecting an olefin to the action of a dilute aqueous solution of an aluminum halide at a temperature of from about 100° C. to about 374° C. and a pressure of from about 100 atmospheres to about 600 atmospheres.

11. A process for producing alcohols which comprises subjecting an olefin to the action of a dilute aqueous solution of aluminum chloride at a temperature of from about 100° C. to about 374° C. and a pressure of at least 100 atmospheres.

12. A process for the production of ethyl alcohol which comprises contacting ethylene with a dilute aqueous solution of aluminum sulphate at a temperature of from about 100° C. to about 374° C. and a pressure of from about 100 atmospheres to about 600 atmospheres.

13. A process for the production of isopropyl alcohol which comprises contacting propylene with a dilute aqueous solution of aluminum chloride at a temperature of from about 100° C. to about 374° C. and a pressure of from about 100 atmospheres to about 600 atmospheres.

14. A process for the production of diisopropyl ether which comprises contacting propylene with a dilute aqueous solution of aluminum chloride at a temperature of from about 100° C. to about 374° C. and a pressure of at least about 200 atmospheres.

15. In a process of hydrating an olefin, the step which comprises subjecting an olefin to the action of an aqueous solution of an aluminum halide at a temperature of at least 130° C., and a superatmospheric pressure of at least 200 atmospheres for a time sufficient to effect hydration of said olefin.

16. In a process of hydrating an olefin, the step which comprises subjecting an olefin to the action of an aqueous solution of aluminum chloride at a temperature of at least 130° C., and a superatmospheric pressure of at least 200 atmospheres for a time sufficient to effect hydration of said olefin.

FRANKLIN A. BENT.